Oct. 15, 1968   K. L. CARLSON   3,405,720
MOVABLE WORK ETCHER
Original Filed May 28, 1965   2 Sheets-Sheet 1

INVENTOR.
KEITH L. CARLSON
BY
Braddock & Burd
ATTORNEYS

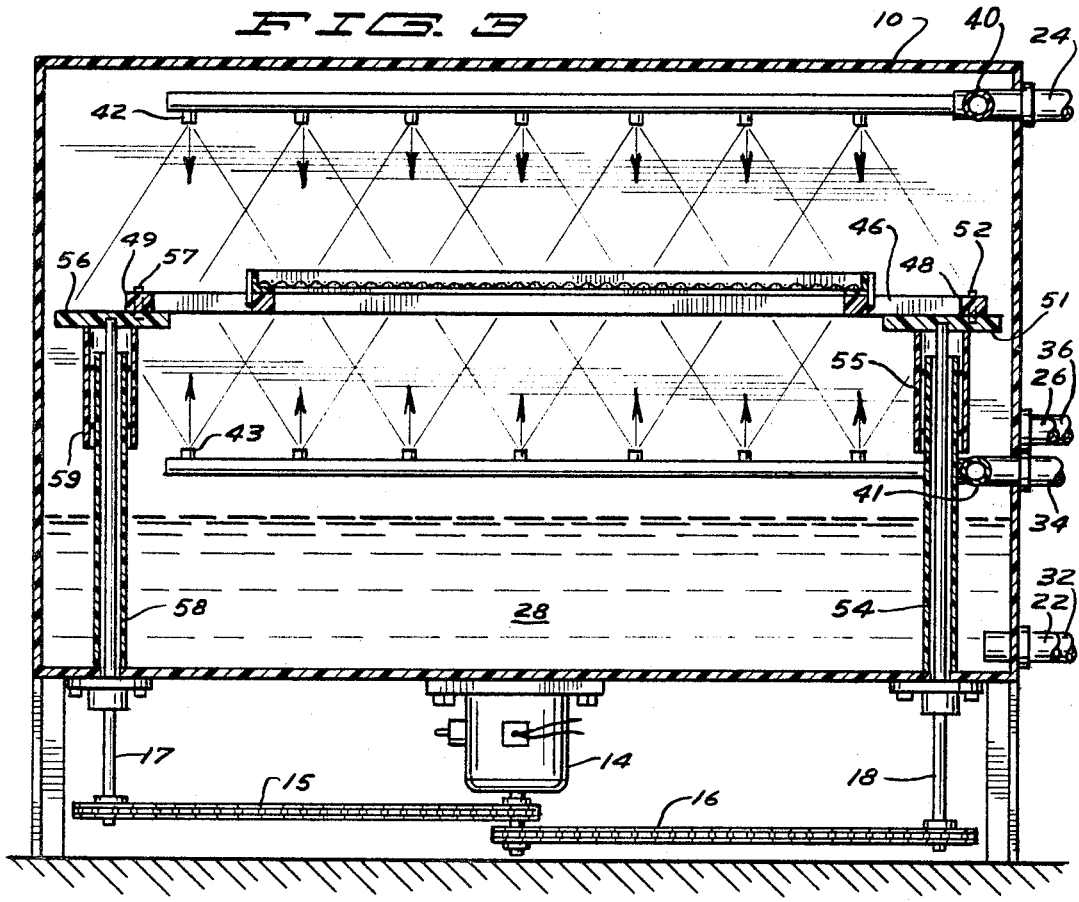
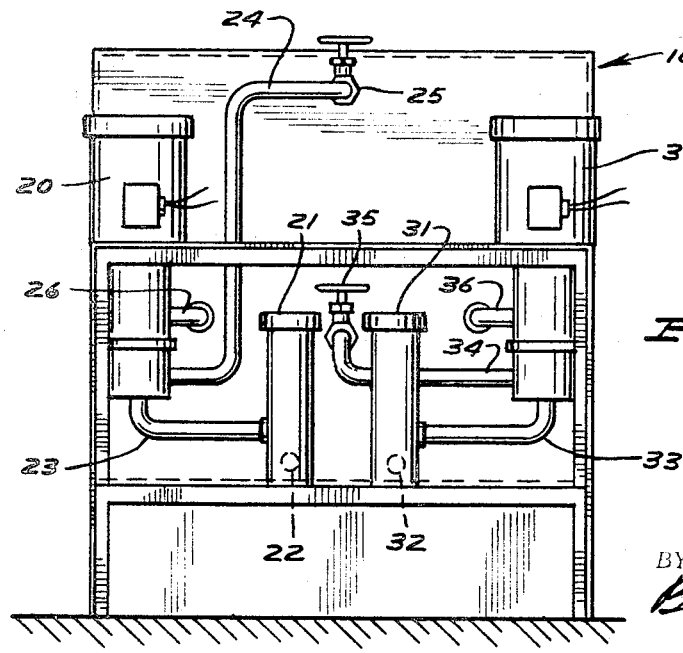

United States Patent Office 3,405,720
Patented Oct. 15, 1968

3,405,720
MOVABLE WORK ETCHER
Keith L. Carlson, Minneapolis, Minn., assignor to Seelye Plastic-Fab, Inc., Minneapolis, Minn., a corporation of Minnesota
Continuation of application Ser. No. 459,683, May 28, 1965. This application July 27, 1967, Ser. No. 656,598
12 Claims. (Cl. 134—140)

ABSTRACT OF THE DISCLOSURE

Spray etching and chemical milling apparatus in which a horizontal carriage, intended to carry work pieces to be etched, is connected at at least one end to a cam which imparts to the carriage a non-rotary, continuous four quadrature motion.

---

This is a continuation of application Ser. No. 459,683, filed May 28, 1965, and now abandoned.

This invention is concerned with etching apparatus, and more particularly with apparatus for imparting motion to work pieces during an etching process.

There are presently many known etching machines. In some such machines work to be etched is held stationary and splashed or sprayed by an etchant. In some cases the work is sprayed from both sides, while in other cases an operator must turn off the machine, remove the work, and replace it to be sprayed on another side. An improvement on the stationary etching machine is a known machine which utilizes fixed spray nozzles for the etchant and imparts an irregular motion to work pieces carried on some type of movable plate. In the known machines of this type it is necessary for the operator to stop the machine and turn the work pieces so that they may be etched on both sides. The motion imparted to the pieces is generally an erratic or stop-start motion. In still another etching machine work is held stationary under a set of sweeping spray nozzles. This imparts a brushing action to the etchant as it is impressed on the work to be etched. A minor improvement of this last named machine is the allowance for a slight tilting motion of the work pieces as they are being sprayed by the sweeping nozzles.

A disadvantage of the stationary machine, where both the spray and work pieces are fixed, is the possibility of blobbing or uneven etching due to pools of etchant gathering on the stationary work pieces, and due to uneven spray patterns from the spray nozzles which may become partially clogged. To overcome this disadvantage the art of etching proceeded to the movable work under a fixed spray pattern machine. However, this did not overcome all the disadvantages of the stationary machine due to the various motions used, including the stop-start motion. In one of the more common machines of this type the work pieces are simply conveyed in one direction under the fixed spray pattern on a conveyor belt. This method does not avoid the problem of patterning on the etched pieces. The term patterning generally means an uneven or irregularly etched surface due to irregularities in the spray pattern. Those machines of this general type which imparted an irregular or rotational motion to the work pieces as they pass under the sprayed pattern have also had problems with patterning in failing to recognize a proper motion which could statistically eliminate patterning. Such a proper motion will be more fully described below in the discussion of the operation of this invention.

The etching machine with sweeping nozzles over a stationary or tiltable work piece again was an improvement on the art as it helped to eliminate patterning due to blobbing. This is because the sweeping motion of the spray imparted a brushing action to the "old" etchant on the surface of the work pieces and allowed the new etchant spray to reach the work surface. However, the irregularities in the etching surface due to the spray pattern were not completely eliminated. The allowance of a tilting motion to the work pieces helped somewhat to overcome spray patterning, but did not eliminate the problem.

The apparatus of this invention overcomes the disadvantage of patterning by imparting a motion to the work pieces which is coordinated with the spray pattern to statistically eliminate patterning due to irregularities in the spray pattern. In addition, the apparatus of this invention achieves the advantages of a sweeping action to the surface of the work pieces during the etchant process. Also, the apparatus of this invention allows two surfaces of the work pieces to be etched at the same time. By a combination of the above mentioned advantages, the apparatus of this invention can reduce the production cycle of the work pieces and thus achieve great savings in the time and cost of production.

Briefly described, the apparatus of this invention comprises a main case or tank having a lower portion which contains an etchant solution. A pair of parallel rotatable shafts extend upwardly from the bottom of the case to a point above the etchant solution in an upper portion of the case. A portion of each shaft extends through the bottom of the case and its connected by a chain drive to a variable speed motor. An eccentric is connected to the top of each rotatable shaft. A carriage having means adapted to carry the work pieces is pivotally mounted to the eccentrics and lies in a horizontal plane. A plurality of spray nozzles are mounted above and below the carriage so that the work carried in a tray on the carriage may be sprayed from both sides. The spray nozzles are connected to spray manifolds which receive etchant solution pumped from the bottom of the case by pump apparatus mounted external to the case. As the pair of shafts are rotated the eccentrics impart to the carriage a continuous four quadrature or front-side-back-side movement. The motion of the carriage causes the work pieces to constantly be changing position under the plurality of spray nozzles, and thus impresses a sweeping motion while statistically removing the possibility of patterning.

In the drawings:

FIG. 3 is a view taken along the section line 3—3 of FIG. 2 showing a side view of the carriage, eccentrics, and rotatable shafts of this invention; and FIG. 4 is an external side view showing the pump and filter connection of the apparatus of this invention.

Figure 1:
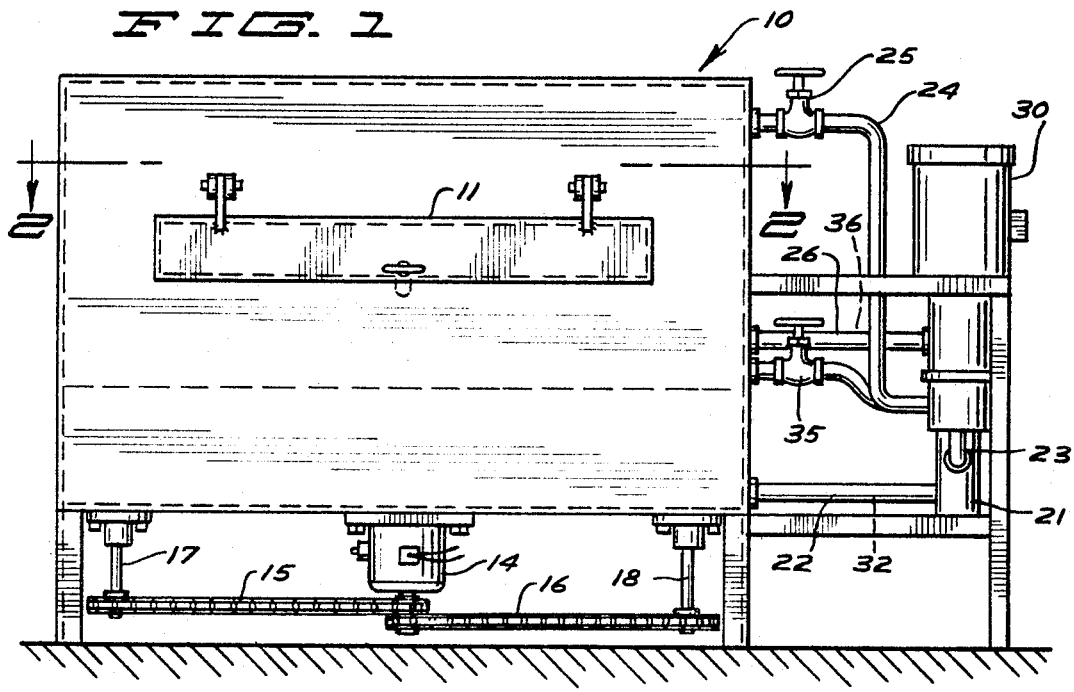
FIG. 1 is an external front view of the machine of this invention.

In FIG. 1 there is shown a front view of a case 10 having a door 11 through which an operator may reach the internal apparatus to place work to be etched. Below case 10 there is mounted a variable speed electric motor 14. Extending downwardly from within case 10 through hermetic seals are a pair of rotatable shafts 17 and 18. Shaft 17 is journaled to motor 14 by a chain 15. Shaft 18 is journaled to motor 14 by a chain 16. External to case 10 there is mounted liquid flow or pump apparatus as described in the subsequent description of FIG. 4.

Referring now to FIG. 4, there is shown mounted external to and on one side of case 10 a pair of electrically driven pumps 20 and 30. A filter 21 is associated with pump 20, and a filter 31 is associated with pump 30. An etchant fluid or solution 28 within the lower portion of case 10 is forced from case 10 through a conduit 22, filter 21, a conduit 23, a conduit 24, through an adjustable valve 25, and into a spray manifold 40 located within case 10.

Echant fluid 28 is also forced through a conduit 32 into filter 31, then through a conduit 33 and a conduit 34 to an adjustable valve 35, and into a lower spray manifold 41 mounted within case 10.

Referring now to FIG. 3 there can be seen a side sectional view of the internal apparatus of case 10. Etchant liquid 28 fills a bottom portion of case 10. Rotatable shaft 18 extends upwardly through a tube 54 which is welded to the inside bottom of case 10. An eccentric 51 is connected to the upper portion of shaft 18, and substantially perpendicular thereto. A pin 52 is connected at one end to eccentric 51 at a point near the edge of eccentric 51, and extends upwardly therefrom. A tube 55 is connected to a lower side of eccentric 51 and extends downwardly over a portion of tube 54. The purpose of tube 55 is to prevent splashing or spraying of etchant solution 28 from reaching shaft 18. To prevent fumes of etchant solution 28 from reaching shaft 18, suitable sealing means may be placed between tubes 54 and 55.

Rotatable shaft 17 extends upwardly into case 10 through a tube 58 welded at one end to the internal bottom of case 10. An eccentric 56 is connected to the upper portion of shaft 17, and is substantially perpendicular thereto. A pin 57 is connected at one end to a point near the edge of eccentric 56, and extends upwardly therefrom. A tube 59 is connected at one end to the lower side of eccentric 56 and extends downwardly and over a portion of tube 58. The function of tubes 58 and 59 is the same as that described above for tubes 54 and 55. A carriage 46 is connected between pins 52 and 57 by means of, respectively, a bushing 48 and a bushing 49. A tray 47 is slidably mounted on carriage 46. There is also shown an upper manifold 40 having a plurality of spray nozzles 42 which direct a predetermined fixed spray pattern onto carriage 46 and tray 47. A lower spray manifold 41 has a plurality of spray nozzles 43 which direct a fixed spray pattern upwardly toward carriage 46 and tray 47.

Figure 2:
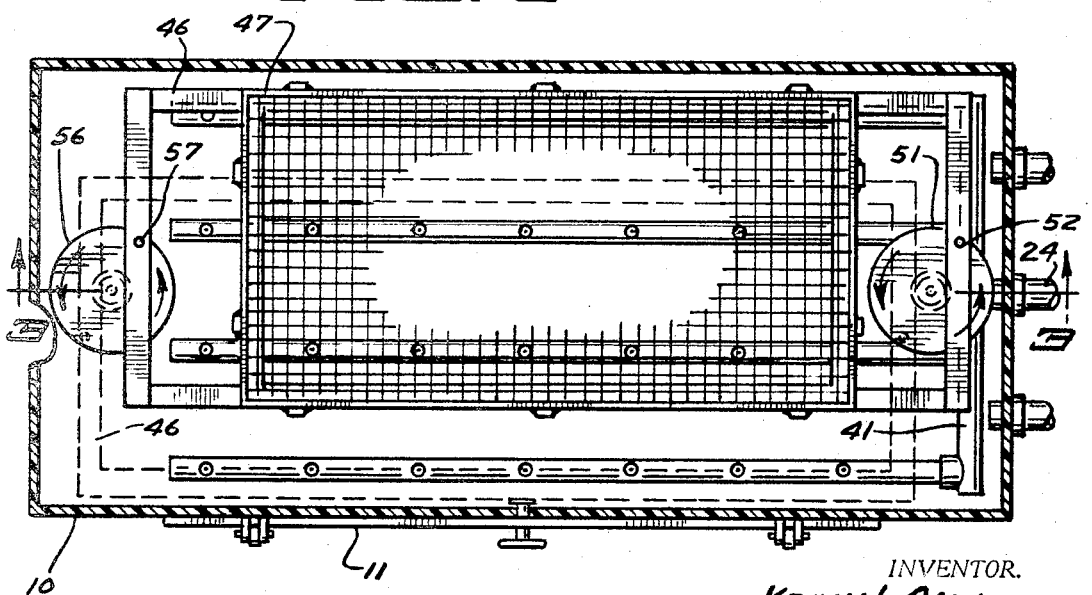
FIG. 2 is a view taken along the section line 2—2 of FIG. 1 showing a top view of the carriage and eccentrics of this invention.

Referring now to FIG. 2, it can be seen that tray 47 has a mesh bottom to facilitate spraying of work pieces held in tray 47 from the lower manifold 41. It may also be seen from FIG. 2 that as carriage 46 is carried on pins 52 and 57, which in turn are mounted, respectively, on eccentrics 51 and 56, it will carry tray 47 in a continuous four quadrature motion, that is, a front-side-back-side motion. The dotted lines in FIG. 2 indicate the position of carriage 46 after pins 52 and 57 are rotated through a 180° arc.

The improved operation of the spray etching and chemical milling machine of this invention can best be understood by reference to the figures. Once pieces to be worked have been placed in tray 47, by sliding tray 47 in and out of case 10 through door 11, the mesh bottom tray 47 is slid into position on carriage 46. The operator then presses a button which simultaneously applies power (not shown) to motor 14 and pumps 20 and 30. The turn-on of pumps 20 and 30 will cause etchant liquid 28 to be pumped through spray manifolds 40 and 41 (as described in the discussion of FIG. 4) and thus out through upper spray nozzles 42 and lower spray nozzles 43. The spray pattern set up by each set of spray nozzles 42 and 43 impinges upon a horizontal plane substantially at the level at which the pieces to be worked are held by tray 47. To avoid patterning of the work pieces it is best to use an overlapping spray pattern, that is, where the three dimensional spray pattern from each spray nozzle overlaps the similar spray pattern on each adjacent nozzle.

At the same time the pumps start the spraying action, motor 14 will rotate causing chains 15 and 16 to rotate, respectively, shafts 17 and 18. As shafts 17 and 18 rotate they will in turn cause rotation of eccentrics 51 and 56. This will cause the rigidly attached pins 52 and 57 to also move in a rotational pattern. Since carriage 46 is pivotally attached between pins 52 and 57 by means of bushings 48 and 49, carriage 46 will move in a continuous four quadrature pattern. It is apparent from FIGURE 2 that this continuous motion is non-rotary; that is, carriage 46 does not turn about an axis. Inasmuch as pins 52 and 57 are near the external periphery of eccentrics 51 and 56, the front to back and side to side translation of carriage 46 will be approximately equal to the diameter of eccentrics 51 and 56, when they are substantially circular as shown in this preferred example. It is of course not mandatory that eccentrics 51 and 56 be circular.

By selecting the spacing of the sets of spray nozzles 42 and 43 with regard to the front to back and side to side translation of carriage 46 and tray 47, work pieces placed on the mesh bottom of tray 47 can be made to move through, for example, various points in the overlapping spray pattern set up by four different spray nozzles. This movement of the work pieces under the sets of spray nozzles 42 and 43 will have at least two major effects on the etching or chemical milling of the work pieces. The motion will cause a sweeping action to be felt on the work pieces as they move under the fixed spray pattern. Also, by moving through a large portion of spray patterns set up by several spray nozzles, the possibility of patterning of the etched work pieces by uneven spray patterns is statistically eliminated. In addition, the combination of the elimination of the problems of sweeping and spraying allows the work to be etched in a shorter period of time, thus allowing a much shorter production cycle, which has in at least one case proven to be 50% shorter than the previously known production cycles.

It should be noted here that though this preferred embodiment uses fixed spray nozzles and therefore a fixed spray pattern, if desired, sets of oscillating spray nozzles could be used to provide a moving spray pattern.

To increase the production output, that is to help shorten the production cycle, the work pieces are etched or chemically milled from two sides, that is from both the upper and lower manifolds 40 and 41 at the same time. To avoid any unevenness in the etching of the upper and lower sides of the work pieces, valves 25 and 35 have been placed between, respectively, pump 20 and upper manifold 40 and pump 30 and lower manifold 41. Thus by adjusting valves 25 and 35 the etchant liquid reaching the upper and lower sides of the work pieces can be made substantially equal. Also in some instances less pressure from the sets of spray nozzles 42 and 43 is desirable, and valves 25 and 35 can be used to adjust the pressure of the spray.

It is not necessary for an operator to periodically stop the machine to turn the work pieces to avoid patterning, as the unique motion of carriage 46 automatically accomplishes this result. This fact also results in a decreased production cycle as compared with prior art spray etching machines.

When the work pieces have been etched, an automatic timer or an operator turns off the power to pumps 20 and 30 as well as to motor 14. A position switch (not shown) in electrical circuit with motor 14, prevents motor 14 from turning off until carriage 46 has been translated to a position where tray 47 can slide through door 11. With the tray thus positioned, the operator may open the door, slide out the tray, remove the work pieces and insert new pieces to be worked.

It is thus apparent that this invention as described provides a unique spray etching or chemical milling device which imparts a particular motion with particular apparatus to pieces to be worked, to overcome problems present in prior art apparatus, and to provide a greater quality of etch with greater accuracy, as well as a decreased production cycle.

What is claimed is:
1. Spray etching apparatus comprising:
upper and lower spray manifolds having a plurality of spray nozzles;
means for forcing an etchant through said nozzles to form a spray pattern on a plane between said manifolds;

first and second vertically disposed rotatable shafts connected to means for rotating said shafts;

first and second eccentrics connected, respectively, to a portion of said first and second shafts; and carriage means pivotally mounted to said first and second eccentrics and lying in a horizontal plane between said upper and lower spray manifolds, said carriage means adapted to carry work to be etched in a continuous four quadrature motion through said spray pattern as said first and second eccentrics are rotated.

2. The spray etching apparatus of claim 1 in which said first and second eccentrics each comprise a substantially circular disk rigidly mounted at its center to the respective of said first and second shafts, and having a vertically extending pin at its outer perimeter, said pin adapted to receive said carriage.

3. In spray etching apparatus in which etchant is forced through spray nozzles on upper and lower spray manifolds to form an overlapping spray pattern at a plane intermediate the spray manifolds, the improvement comprising;

a pair of parallel vertically extending rotatable shafts in fixed space relation and having an upper portion terminating at a point lying intermediate the spray manifolds;

said pair of shafts being journaled at a lower portion to means for rotating said shafts;

a pair of substantially circular disks having a perpendicular pin mounted at an outer perimeter thereof;

means at the center of each of said pair of disks rigidly mounting one of said disks to each of said pair of shafts, so that said disks lie in a horizontal plane intermediate the spray nozzles;

carriage means having means for pivotally mounting said carriage means to said pins on said pair of disks, said carriage means adapted to carry work to be etched in a continuous four quadrature motion through the spray pattern as said shafts rotate.

4. The improved spray etching apparatus of claim 3 in which said means for rotating said shafts comprises an adjustable motor for varying the speed of rotation of said shafts, and thus varying the speed of the four quadrature motion of said carriage means.

5. The improved spray etching apparatus of claim 3 in which said carriage means comprises a substantially rectangular frame having bushings connected in two ends thereof for pivotal mounting to said pins, and having a tray slidably mounted thereon, said tray having a mesh bottom adapted to hold the work to be etched available to the spray pattern from the upper and lower spray manifolds.

6. Spray etching and chemical milling apparatus comprising:

a container including a sump for holding liquid etchant;

first and second parallel rotatable shafts extending upward from the bottom of said container and terminating at an upper end within said container;

a variable speed motor journaled to at least one of said shafts for rotating said shafts, said motor being mounted exterior to said container;

first and second disks mounted at a center point, respectively, to the upper end of said first and second shafts, said disks being substantially in the same horizontal plane;

first and second vertically extending pins connected, respectively, to said first and second disks at a predetermined distance from said center point;

upper and lower spray manifolds mounted within said container, and having a plurality of spray nozzles adapted to direct a spray pattern generally toward the horizontal plane of said disks;

pump means for forcing the liquid etchant from said sump and through said pray nozzles, said pump means being mounted exterior to said container and hermetically connected to said sump and said manifolds;

a substantially rectangular carriage frame having bushings connected at two opposite ends thereof, said bushings for pivotally mounting said carriage frame on said first and second pins so that when said shafts rotate said pins impart a continuous four quadrature motion to said carriage frame; and a carriage slidably mounted on said carriage frame, said carriage adapted to slide through a doorway in said container for loading of work pieces, and adapted to carry the work pieces on said moving carriage frame during a production cycle.

7. The spray etching and chemical milling apparatus of claim 6 in which said plurality of nozzles are in spaced relation so as to cause a fixed over-lapping spray pattern to impinge upon the work pieces, the continuous four quadrature motion of said carriage frame causing the work pieces to constantly change position within the fixed spray pattern.

8. The spray etching and chemical milling apparatus of claim 6 in which said carriage has a mesh bottom to facilitate spraying of the work pieces from both of said upper and lower spray manifolds.

9. The spray etching and chemical milling apparatus of claim 6 in which said pump means comprises a pair of pumps, each connected to one of said upper and lower manifolds, and valve means for separately controlling the force of spray from said upper and lower manifolds.

10. In spray etching and chemical milling apparatus in which an etchant is pumped through manifolds having spray nozzles to impinge upon work pieces, the improvement comprising:

a movable horizontal carriage for carrying the work pieces, said carriage mounted within an over-lapping spray pattern formed by the spray nozzles; and means connected to said carriage for moving said carriage in a continuous four quadrature motion so that said work pieces all travel in identical paths within said spray pattern.

11. The apparatus of claim 10 in which two faces of said work pieces are sprayed simultaneously comprising:

first and second manifolds mounted, respectively, above and below said carriage, and having spry nozzles in spaced relation causing an over-lapping spray pattern to impinge upon upper and lower faces of work pieces on said carriage.

12. The apparatus of claim 10 in which:

said four quadrature motion is non-rotary in all respects.

References Cited

UNITED STATES PATENTS

| 760,276 | 5/1904 | Thorpe | 134—144 |
|---|---|---|---|
| 2,328,504 | 8/1943 | Smith | 198—19 |
| 2,358,507 | 9/1944 | Haberstump | 134—142 XR |
| 2,539,112 | 1/1951 | Bash | 134—142 XR |
| 3,054,411 | 9/1962 | Randall | 134—111 |
| 3,192,935 | 7/1965 | Hanifan | 134—142 |
| 3,224,914 | 12/1965 | Benton et al. | 134—144 XR |
| 3,266,502 | 8/1966 | Copeland | 134—144 XR |

ROBERT L. BLEUTGE, *Primary Examiner.*